United States Patent [19]

Gottelt

[11] 3,854,839

[45] Dec. 17, 1974

[54] BOTTLE BORING TOOL
[75] Inventor: Herbert R. Gottelt, Mount Prospect, Ill.
[73] Assignee: Alco Standard Corporation, Valley Forge, Pa.
[22] Filed: Mar. 2, 1973
[21] Appl. No.: 337,671

[52] U.S. Cl. .................. 408/129, 82/1.5, 408/1, 408/159
[51] Int. Cl. .................. B23b 27/00, B23b 3/26
[58] Field of Search .......... 408/159, 157, 147, 124, 408/129; 80; 145/114.5, 124; 90/18; 82/1.2, 1.4, 82/1.5; 166/55.6, 55.7, 55.8; 175/286, 272

[56] References Cited
UNITED STATES PATENTS

| | | | |
|---|---|---|---|
| 599,655 | 2/1898 | Huben | 145/124 |
| 1,511,898 | 10/1924 | Makay | 408/159 |
| 2,236,944 | 1/1941 | Gerardi | 408/159 |
| R21,824 | 6/1941 | Lowery | 166/55.8 |

Primary Examiner—Francis S. Husar
Attorney, Agent, or Firm—Gomer W. Walters

[57] ABSTRACT

An apparatus for enlarging the diameter of an existing bore within a turbine shaft or the like along a desired linear portion of the shaft having a boring head mounted on a drive shaft for rotation therewith after insertion within the existing bore. The boring head has a pair of opposed matable cutting tool means pivotally mounted within it which are radically advanced or retracted toward or away from the walls of the existing bore by operation of a cam assembly also mounted in the boring head for axial movement therealong and engaging an end of the tool means opposite the cutting head. The cam assembly is mounted for movement on a threaded transmission member which is rotated to move the cam assembly by an adjustment shaft positioned for calibrated angular movement within an interior passageway formed in the drive shaft. The boring assembly is rotated for cutting by a drive means engaging the exterior surface of the drive shaft and is linearly moved within the turbine shaft by a driven feed table.

20 Claims, 7 Drawing Figures

PATENTED DEC 17 1974 3,854,839
SHEET 1 OF 2
FIG_1_
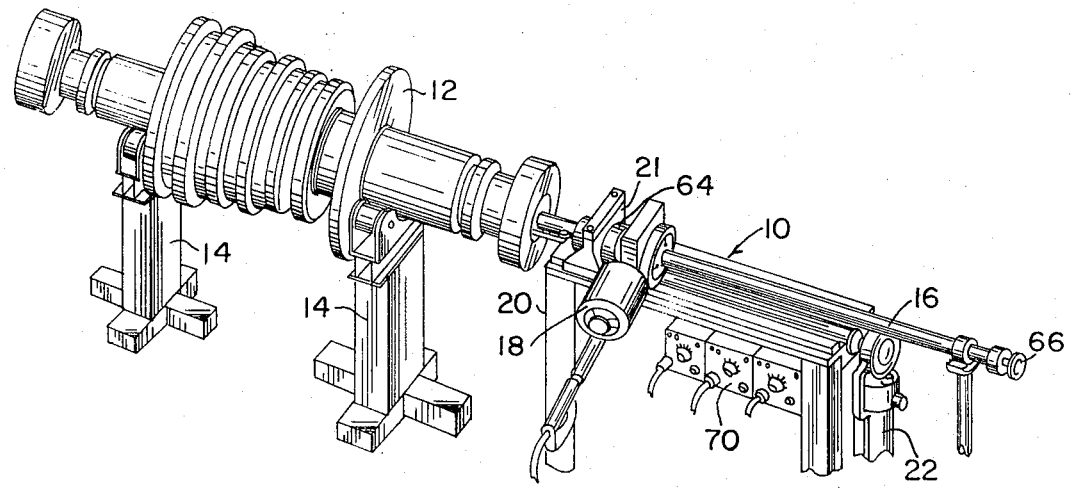
FIG_2_
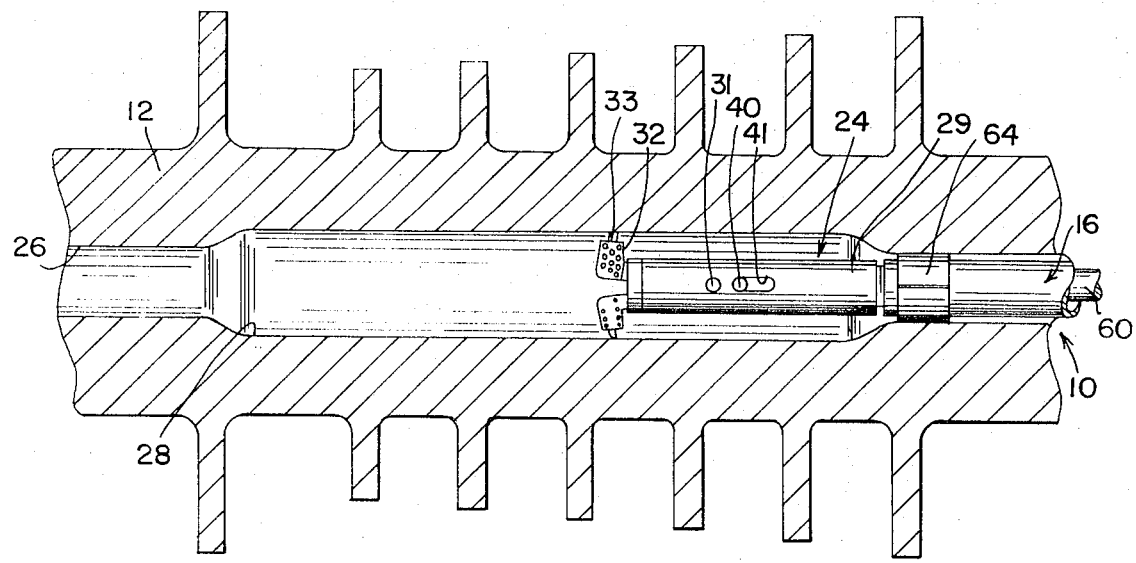
FIG_3_
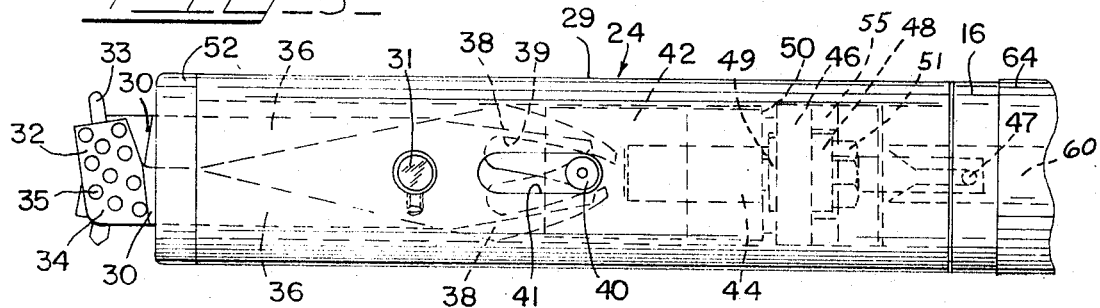

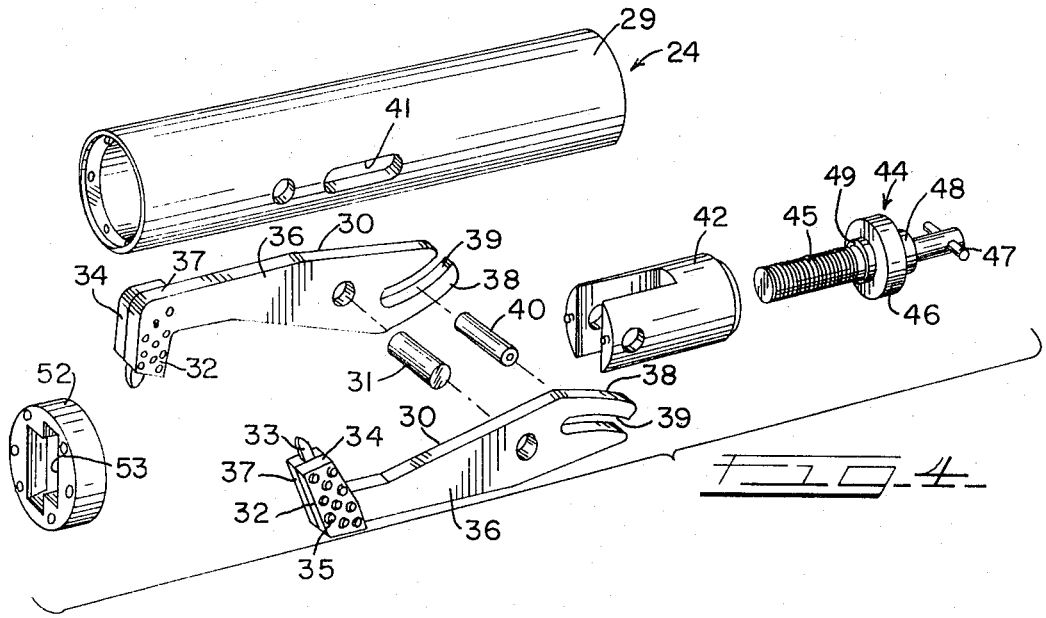
FIG_4.
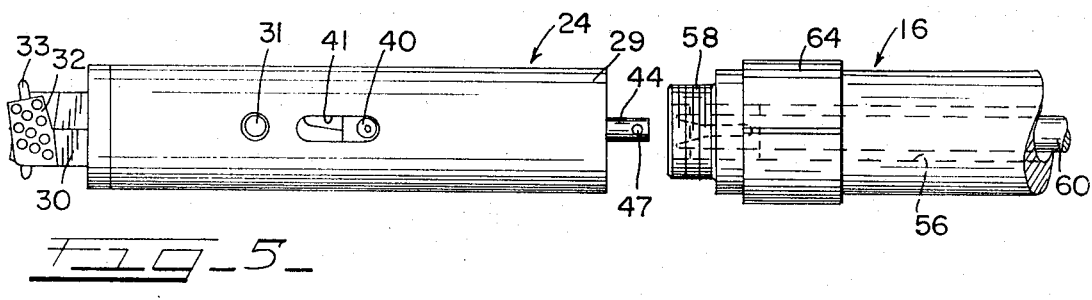
FIG_5.
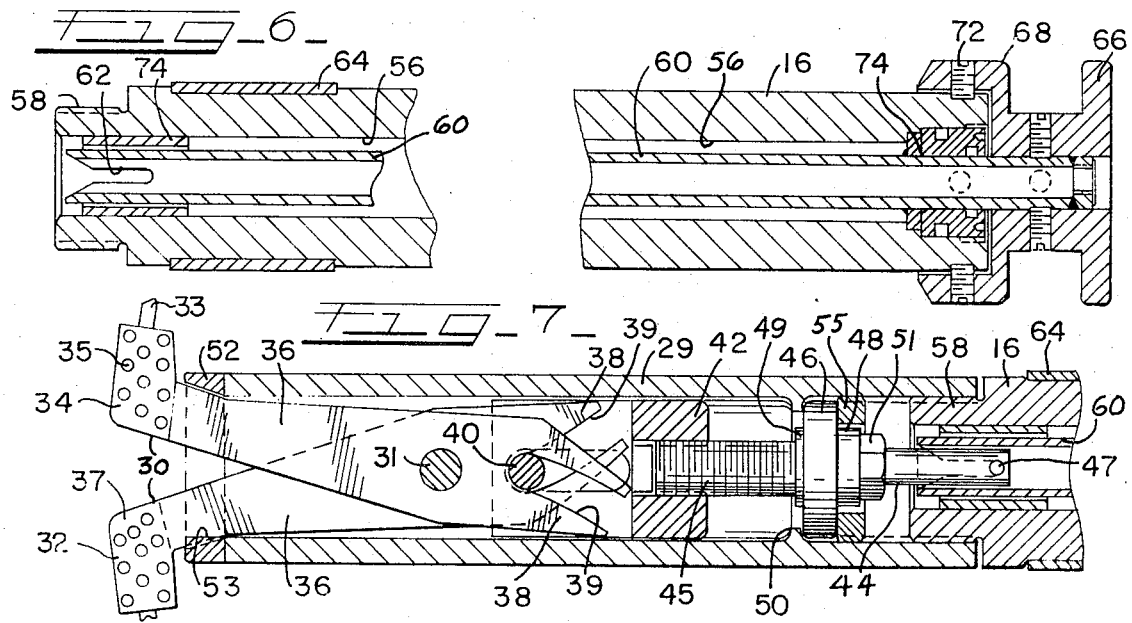
FIG_6.
FIG_7.

BOTTLE BORING TOOL

BACKGROUND OF THE INVENTION

This invention relates to a boring apparatus in general, and, in particular, to an apparatus for enlarging the diameter of an existing bore within the interior of a turbine shaft or the like.

The existence of stress risers or stress points in the vicinity of the center line of turbine or other shafts used in high-power applications such as hydroelectric plants and the like has long presented a problem to engineers and manufacturers. These built-in stress risers and stress points are inclusions and impurities introduced into the shaft at the time it is manufactured or formed. Since it is desirable, and often necessary, to eliminate or at least reduce the number of stress risers or stress points formed in the shafts, an attempt has been made to accomplish this by drilling a three to four inch diameter hole along the central axis of the turbine shaft. This hole, in addition to removing all the material along its length would also remove these inclusions.

Such a procedure was considered to be adequate until recently when the fast-developing field of nuclear density testing was applied to testing the soundness of such drilled turbine shafts. Unfortunately, it was discovered that a number of stress points usually remained in the shafts close to the center hole, despite the opening of the 3 or 4 inch bore.

It is not yet known with certaintY in the industry whether these small inclusions or cracks propogate with time, as expected, because of the lack of previous test data. However, because of the expense and potential danger involved in failure of a turbine shaft while in operation in a large scale utility or the like, it has been considered extremely desirable to eliminate, if possible, the number of these stress points. The problem with so doing would be that boring a larger diameter hole uniformly from one end of the shaft to another end of the shaft would severely reduce the strength of the shaft at the ends. It would be ideal, therefore, to "bottle bore" the shaft, that is, to enlarge an existing 3 or 4 inch bore to a larger diameter along a selected portion of the interior length of the shaft, while tapering back to the diameter of the existing bore near each end. There is no presently existing equipment in the industry, however, which can accomplish this type of bottle bore to the dimensions necessary. No prior apparatus or method will allow expansion of the interior diameter to more than twice the width of the tool head. Moreover, prior apparatus, such as lathes, are not portable and require turning of the entire turbine to accomplish boring.

DESCRIPTION OF THE INVENTION

The present invention is directed to a bottle boring apparatus which may be inserted into an existing bore of a turbine shaft and moved axially along the shaft as the boring head blades are advanced outwardly to open up an existing bore to any practical diameter limited only be the weakening of the shaft itself and the reduction of the safety factor. This invention overcomes the disadvantages of the prior art and accomplishes bottle boring to any desired diameter by a boring head which is mounted on and rotated with a boring drive shaft. The sleeve-like boring head has a pair of opposed matable tool holding members pivotally mounted within it having guided boring head blades mounted on their forward ends and having curved or straight cam follower slots formed in their rearward ends.

A cam pin is mounted in slots formed in the walls of the boring head to allow axial movement along the central axis of the boring head. This cam pin engages the oppositely angled slots on each of the tool members and acts on the slope of curve of the slots, as it is moved, to pivot the members about their pivot point within the boring head and thereby radially advance or retract the cutting blades relative to the boring head. The cam pin is held by a yoke which moves along the threads of a transmission screw mounted in a stationary position within the boring head. The transmission screw is turned, resulting in linear movement of the cam pin, by a torque tube positioned inside an interior passageway formed in the boring drive shaft. The forward end of the torque tube has slots formed in it which engage a cross-pin at the rearward end of the transmission screw.

The torque tube extends the length of the boring drive shaft and is rotatable relative to the boring drive shaft by a calibrated disc mounted on its rearward end. This disc is calibrated to indicate accurately movement of the tool head members in thousandths of an inch.

This invention allows the cutting blades to be positively set for deep cuts and alternatively, to be retracted to remove the boring bar and head through the neck of the bottle to clean out chips. The boring head may be reinserted and reset to the same or a deeper cut to insure repeatedly accurate results.

The hollow torque tube may be used to introduce compressed air and cooling fluid into the apparatus to keep the working parts of the boring head clear of chips and to cool the tool blades and aid in obtaining a good machined finish. The boring head blades and tool members are designed to support themselves in right hand rotation and prevent tool clatter. The scissor-like action of the blades prevents side loads and aids in maintaining a true, round and concentric bore.

Accordingly, it is an object of this invention to provide a bottle boring apparatus which is simple in construction and operation and completely portable, yet achieves completely reliable and effective results.

It is a further object of this invention to provide a bottle boring apparatus which may be inserted into the interior of an existing bore of a turbine shaft and may be selectively controlled in its operation to effectively and efficiently enlarge the existing bore to any diameter desired to eliminate stress risers and stress points.

It is another object of this invention to provide a bottle boring apparatus which may be effectively used to bore a distance sufficient to bottle bore a turbine shaft.

It is a still further object of this invention to provide a bottle boring apparatus which accomplishes, simultaneously, both linear and radial advance of the cutting blades.

It is still another object of this invention to provide a bottle boring apparatus which allows precise and accurate radial adjustment of the cutting blades by a means exterior to the interior of the turbine shaft.

It is one more object of this invention to provide a bottle boring apparatus which allows for the introduction of a flushing and cooling fluid into the bore during the boring operation.

It is still one more object of this invention to provide a bottle boring apparatus which is rugged in construction and precise in operation having closely guided boring head blades to prevent tool clatter and a scissorlike action of the blades to prevent side loads and aid in maintaining a true, round and concentric bore.

These and other important objects of this invention will become apparent from the following description taken in conjunction with the drawings illustrating a preferred embodiment wherein:

FIG. 1 is a perspective view of the bottle boring apparatus of this invention being used to enlarge the existing bore of a turbine shaft;

FIG. 2 is a cross sectional elevational view taken through the conventional turbine shaft shown in FIG. 1 of the boring head of the bottle boring apparatus of this invention in operation within the shaft;

FIG. 3 is a side elevational view of the boring head shown in FIG. 2 in non-boring position, showing, in hidden lines, the cam assembly and cutting tool members disposed within the boring head;

FIG. 4 is an exploded view of the boring head shown in FIG. 3;

FIG. 5 is a side elevational view of the bottle boring head and a forward fragment of the drive shaft of the bottle boring apparatus of this invention showing the means for operative engagement between them;

FIG. 6 is a side cross-sectional view of the drive shaft of the bottle boring apparatus of this invention shown in FIG. 1; and, FIG. 7 is a side cross-sectional view of the boring head of the bottle boring apparatus of this invention in boring position as shown in FIG. 2.

Referring now to the drawings, and, in particular to FIG. 1, the bottle boring apparatus of this invention is shown generally at 10. This bottle boring apparatus 10 is shown in actual boring position within a turbine shaft 12 which is supported by stands 14 in position for the boring operation. The boring apparatus 10 includes a boring bar or boring drive shaft 16 which is rotated about its central axis at a desired angular speed by a boring bar drive means 18. The boring drive shaft 16 and the entire boring apparatus 10 is supported on a saddle 21 mounted for linear movement along a feed table 20. Movement of the saddle 21 along the feed table 20, and thus movement of the boring apparatus 10 into the existing bore of the turbine shaft 12 is accomplished by a feed table drive means 22. The action of the boring bar drive means 18 and feed table drive means 22 are controlled and correlated by electronic control means 70 mounted under the feed table 20.

The bottle boring apparatus 10 also includes a boring head 24 mounted on the forward end of boring drive shaft 16 for rotation with drive shaft 16. The bottle boring apparatus 10 is movable into and out of the existing bore 26 of the turbine shaft 12 to form a bottle bore 28, as shown in FIG. 2, of the length desired, by the assembly including the feed table 20 shown in FIG. 1, as will be described in detail below.

The boring head 24 includes an outer hollow, generally cylindrical sleeve or shell 29 which is open at its opposite ends. A pair of cutting tool members 30 are pivotally mounted within shell 29 on a pivot pin 31 which is disposed generally transversely to the central axis of the shell 29 at approximately the midline of the shell. The cutting tool members 30 each have a forward cutting blade portion 32 which includes a replaceable cutting bit 33 which engages the interior wall of the turbine shaft 12 to perform the actual cutting. This bit 33 is clamped in place by a removable holding plate 34 joined to a clamp plate 37 of the tool member 30 by a number of fasteners 35 which are disposed to the outside of the bit 33. The cutting tool member 30 also has a cam follower portion 38 at its rearward end. The blade portion 32 and cam follower portion 38 are joined by a tool arm 36. The cutting tool member 30 is preferably integrally formed from materials which will be discussed in detail below.

The cam follower portion 38 of the cutting tool member 30 has a cam follower slot 39 formed in it which is open at one end and which receives, for sliding movement therein, a cam pin 40. The cam follower slots 39 are generally curvilinear in shape having approximately a 3 inch radius. The slots 39 may also be formed straight rather than curved, however, the curved slot permits linear advancement of the cutting blade portion 32, as will be explained below.

The two cutting tool members 30 are oppositely positioned, similar to the members of a scissors, with their curved or straight slots 39 bending in generally opposite directions from the horizontal. The cam pin 40 is positioned generally transversely to the central axis of the sleeve 29 and rides in corresponding elongated pin mounting and travel slots 41 formed in the opposite walls of the sleeve 29. The cam pin 40 is also positioned so that it rides in the cam follower slots 39 formed in the cam follower portion 38 of each tool member 30. It is easily seen, in FIGS. 3, 5 and 8 that as the cam pin 40 is moved toward the forward end, i.e., the cutting blade portion 32, of the boring head 24, it will move axially along slot 41 and within movable cam follower slots 39, causing the tool members 30 to be pivoted about pivot point pin 31 in opposite directions. As this happens, the tool members 30, because of their reversed construction will have their cutting blade portions 32 moved radially outwardly toward the interior surface of the turbine shaft to be bored.

The cam pin 40 is mounted between forwardly extending members of a yoke 42. The opposite end of the yoke 42 has a threaded bore to threadedly engage a forward threaded portion of a transmission bar 44. The transmission bar 44 is maintained in a stationary axial position within the sleeve 29 by a bearing containment ring 46 disposed near its mid-portion, which is brought to bear on an annular, inwardly extending shoulder 50 formed within the sleeve 29, upon assembly of the boring apparatus 10. The transmission bar 44 is mounted and rotates freely within thrust bearings 48 and 49 interiorally engaging containment ring 46 and mounted between a stepdown shoulder on bar 44 and a retaining nut 51 to prevent any axial movement of bearings 48 and 49 on bar 44. Containment ring 46 is prevented from axial movement by stop ring 55 threaded into sleeve 29 to a position adjacent it. The rearward end of the transmission bar 44 has a cross pin 47 disposed through it which is used to engage a means for adjusting the cutting diameter of the boring head mounted in the boring drive shaft 16, as will be explained below.

A sleeve cap 52 is positioned over the forward end of the sleeve 29. This cap 52 has a pair of adjacent blade guide slots 53 formed in its face which allow radial movement of the cutting tool members 30. These slots 53 are open to one another across their center portion, as shown in FIG. 4, to accomodate a width approximately equal to the width of both cutting tool members 30, while at their outward end portions, each guide slot 53 will only accomodate the width of a single tool member to aid in supporting this tool member during the cutting operation. One of the unique advantages of the present invention is that the blade portions 32 of tool members 30 are so disposed within the guide slots 53 in cap 52 that when the boring head 24 is rotated in a right-hand or clockwise direction, the blade portions 32 act to support themselves. The scissor-like action of the tool members 30 prevents the adverse affects of side loads and the supporting guide slots 53 prevent excessive play between tool members 30 and tool clatter. Both advantages aid in maintaining a true, round and concentric bore.

The boring head 24 is mounted on the boring drive shaft 16 by threadedly engaging an interior threaded, rear portion of the sleeve 29 by an exterior threaded, reduced diameter portion of the drive shaft 16, as shown in FIG. 5. This coupling is threaded in a direction, preferably right-hand, so that when the drive shaft 16, and boring head 24 mounted on it, are rotated in a clockwise direction, the threaded connection between the two will not be loosened.

The boring drive shaft 16 has an interior hollow passageway 56 formed along its length as shown in FIGS. 5 and 6. A hollow torque tube 60, slightly shorter than the drive shaft 16, is inserted into and along passageway 56. This torque tube is open at its opposite ends and has a slot 62 formed in the forward end adjacent the boring head 24 to receive the cross pin 47 mounted on the transmission bar 44. The sides forming slot 62 diverge at the open, forward end of torque tube 60 to aid in aligning the cross pin 47 within the slot. The slot 62 is of sufficient length to allow the cross pin to be inserted within it a sufficient distance to permit the threaded portion 58 of the drive shaft 16, to be completely threaded into the boring head 24. In this position, the rotation of the drive shaft 16 about its central axis will cause rotation of the boring head 24 about the same central axis while the transmission bar 44 is maintained in a stationary position within the boring head 24.

The boring drive shaft 16 may be formed in any length desired or necessary, depending upon the length of bore which is to be made. Disposed at selected points about the exterior surface of the drive shaft 16, as shown in FIGS. 2 and 5, are a plurality of outer drive shaft bearings 64 which support the boring bar 16 within the turbine shaft 12. These bearings are preferably made of a material such as that sold under the trademark "TEFLON" by DuPont, which is resistant to heat and abrasion and reduces friction between the metal surfaces.

The boring drive shaft or boring bar 16 has, at its extreme rearward end, opposite the boring head 24, a novel calibration disc 66 which is preferably integrally formed as part of a thrust collar 68 movably mounted over the outside of the rearward end of the drive shaft 16, by adjustable set screws 72 or the like, as shown in FIG. 6. Collar 68 thrusts against the end of the boring drive shaft 16 and engages the end of torque tube 60 positioned in passageway 56. By adjusting the thrusting force of collar 68 against the boring bar 16, the collar 68 may be turned to rotate torque tube 60 to a selected angular distance relative to boring bar 16. The set screws 72 may then be re-tightened on boring drive shaft 16 when a desired degree of rotation has been obtained, as will be explained below. The angular movement of torque tube 60 relative to boring bar 16 is aided by interior sleeve bearings 74 within passageway 56. These sleeve bearings 74 also act to center the torque tube and to prevent its axial and lateral movement.

The calibration disc 66, which is formed as a part of the collar 68, is preferably calibrated in standard units of measure, such as thousandths of an inch, corresponding to the radial advancement of the cutting blade portions 32 of tool members. 30. When the collar 68 is rotated relative to the boring drive shaft 16, it acts to rotate the torque tube 60 a like angular distance. Since the torque tube 60 engages the cross pin 47 which is mounted on the transmission bar 44, the transmission bar will also be rotated. The transmission bar 44 is maintained in a stationary axial position, relative to shell 29 so that the angular movement of bar 44 caused by rotation of the torque tube 60, is translated into axial movement of the yoke 42 and the cam pin 40 relative to bar 44 and shell 29, since there are the only elements free to move axially within shell 29. Thus, as torque tube 60 and transmission bar 44 are rotated, the yoke 42 will be moved axially along the threaded portion 45 of the transmission bar 44 thereby moving the cam pin 40 axially in the elongated slots 41. As cam pin 40 moves in slots 41, cam follower slots 39 formed in the cutting tool members 30, likewise move on it, causing tool members 30 to be pivoted about pivot point 31 and either radially extended or retracted.

It has been found that the use of a curvelinear cam follower slot 39, on a radius of approximately 3 inches, will permit a direct linear correlation between the angular movement of the calibration disc 66 on the thrust collar 68 and the radial movement of the cutting tool members 30. Thus, it is possible to precisely set a desired boring diameter of the cutting tool members 30 of the boring head 24, even though the boring head 24 is completely disposed within a turbine shaft 12, from outside of the turbine shaft, with complete confidence and assurance of accurate and repeatable results.

The hollow torque tube 60 opens through the disc 66 on the collar 68 in the form of a standard fitting for attachment to a compressed air or cooling fluid line. These fluids may be pumped along the length of the torque tube 60 and through the boring head 24 to keep the working parts of the boring head clear of chips and to cool the tool bits and aid in maintaining a good machined finish.

The boring drive shaft 16 may be driven by a commercially available portable power drive device 18, such as a No. 68 Power Drive manufactured by Toledo-Beaver Tools of Toledo, Ohio. This power drive 18 is fitted with a special drive adapter which is clamped over the exterior circumferential surface of the boring drive shaft 16, as shown in FIG. 1, and tightened. The drive adapter will fit directly over on the shaft 16 to engage it and has not been found to slip. Alternatively, a key way could be formed in the bar 16 to which the adapter could be locked. This power drive 18, and the bottle boring drive shaft 16, are mounted on a saddle 21 which moves laterally along the feed table 20 to advance the boring head 24 and drive shaft 16 axially into the turbine shaft. A series of outer bearings 64 support drive shaft 16 and ultimately the entire boring apparatus 10 on the saddle 21.

The feed table 20 may be a standard, manual feed table having a hand wheel disposed at one end. The hand wheel, however, is preferably replaced with an adapter which may be rotated by a feed drive motor 22, such as the Ridgid No. 700 Power Drive, as shown in FIG. 1. Through the electronic control means 70, the feed drive motor 22 is capable of an infinitely variable speed of from 0–33 rpms, which corresponds to 0–3.3 inches of lateral movement per minute. Use of a special transmission may give variable speeds of 0–132 rpms, or 0–13.2 inches per minute. The rotational drilling speed of the boring apparatus of this invention will depend, of course, on the hardness of the cutting bits 33 used. These cutting bits 33 on the cutting tool members 30 may be formed of high-speed steel for use at lower drilling speeds to permit operation of the boring head 24 at about 14 revolutions per minute or 60 surface feet per minute. On the other hand, harder cutting bits such as those formed of carbide, may be used with higher cutting speeds corresponding to up to 400 surface feet per minute.

It is clear that the above description of the drive motors and adapters as well as the angular and lateral operational speeds suggested are not intended to be limiting and are limited only by the materials used.

To illustrate the operation of the present invention, an actual example of bottle boring may be described. This example is for the purposes of illustration only and the numerical dimensions given are in no way limitations on the ability of the invention. It was found desirable, in this case, to selectively eliminate remaining inclusions and stress points in a turbine shaft by opening up an existing 3⅜ inch bore to a 6½ inch inside diameter bore. The entire boring operation was begun by inserting the boring head 24 and a portion of the boring shaft 16, 44¼ inch inside the existing bore. The existing bore was opened through a 2 inch radius on a 30° taper and blended into a 6½ inch bore by a 2 inch radius by continuous precision adjustment of the calibration disc during rotation of the boring apparatus 10 and lateral movement of the apparatus 10 on feed table 20. The 6½ inch cylindrical bore was continued for a total length of 53⅜ before tapering back in reverse manner at 30° through similar radii to run out into the existing 3⅜ inch bore again as shown in FIG. 2.

The present bottle boring apparatus can successfully bore to any desired length or depth of shaft required depending upon the length of the boring drive shaft 16 used. It can open up an existing bore of boring head diameter to any practical diameter, the only limiting factor being the weakening of the turbine shaft itself and reduction of the safety factor. In order to achieve larger diameter bores, the cutting tool members may be made of different lengths. The calibration dial, of course, must be calibrated differently depending upon the tool member length.

The materials suitable for use in manufacturing various elements of the boring apparatus, such as the boring head or the drive shaft should be highly resistant to shear and bending stresses and high temperatures. Such materials might consist of steel, steel alloys or various hardened metals.

While the invention has been described in relation to a preferred embodiment thereof, it will be obvious to those skilled in the art that the structure is capable of wide variation without departing from the principles of the invention.

I claim:
1. A boring head particularly adapted for use in a boring assembly to enlarge the diameter of an existing bore within a turbine shaft or the like along a desired linear portion of the shaft, including shell means having a central axis and formed to allow its insertion within the existing bore of the shaft, said shell means being rotatable about said central axis within said bore, at least one cutting tool means mounted within said shell means and rotatable therewith about said central axis, said tool means being mounted within said shell means for pivoting movement relative thereto, said tool means having a cutting portion extensible linearly beyond a forward end of said shell means and being movable radially with respect to the central axis of said shell means, cam assembly means mounted within said shell means, said cam assembly means including a cam means disposed transversely to the central axis of said shell means and along a diametrical axis thereof, said cam means being mounted between opposite, axially extending slots formed in said shell means for axial travel therealong, said cam means engaging a cam follower portion of said tool means to radially move said cutting portion of said tool means by pivoting said tool means in response to the axial movement of said cam means along said central axis of said shell means, said cam assembly means also including a yoke member to transmit such axial movement to said cam means, said yoke member having a forked portion mounted on said cam means and a body portion integrally formed with said forked portion and disposed at an end of said yoke means opposite said cam means, said body portion adapted to threadedly engage transmission means mounted in stationary axial position with respect to said boring head, said transmission means being rotatable about a central axis thereof to move said yoke means and thereby said cam means to a precise, selected position relative to said shell means thereby providing selected radial positioning of said cutting portion of said cutting tool means to allow, upon rotation of said shell means and said cutting tool means and cam assembly means therewith, said boring head to cut an enlarged bore of pre-selected diameter in the turbine shaft to selectively eliminate undesirable inclusions and stress points within such shaft.

2. The boring head of claim 1 wherein said shell means is a generally cylindrical hollow sleeve having one end thereof mounted on a rotatable drive shaft for rotation therewith inside the turbine shaft to be bored.

3. The boring head of claim 1 wherein said cutting tool means includes at least two tool holding members, each of said tool holding members having said cutting portion disposed at an inward end of a lever arm portion, said cutting portion being formed by an outwardly extending cutting blade mounted on said inward end of said lever arm portion, each of said tool holding members having a cam follower portion formed on the opposite end of said lever arm portion, said cam follower portion having a generally outwardly extending slot formed therein, each of said tool holding members being pivotally mounted in opposed matable relationship on a pivot pin disposed transversely to said central axis of said shell means along a diametrical axis of said shell means, said outwardly extending cam follower slot on each of said tool holding members engaging said cam means of said axially adjustable cam assembly such that as said cam assembly is moved axially along the central axis of said shell means, movement of said cam means of said cam assembly in each of said cam follower slots will cause each of said tool holding members to pivot in opposite directions about said pivot pin such that said cutting blades will be radially advanced or retracted.

4. A boring assembly particularly adapted for use in bottle boring turbine shafts and the like to enlarge the diameter of an existing axial bore within such shafts along a desired linear portion of the shaft to reduce stress points formed in the vicinity of the center line of the shaft during its manufacture, including boring head means having a central axis and formed to allow its insertion into the existing bore of the shaft, said boring head means being rotatable about said central axis, within the bore, cutting tool means mounted within said boring head means and rotatable therewith about said axis, said tool means being mounted within said boring head means for pivoting movement relative thereto, said tool means having a cutting portion extensible linearly beyond a forward end of said boring head means and being movable radially with respect to the central axis of said boring head means, cam assembly means mounted within said boring head means, a portion of said cam assembly means movable axially along said boring head means, boring drive assembly means having an outer, generally cylindrical boring drive means rotatable about a central axis thereof, said outer drive means having said boring head means mounted at a forward end thereof for rotation therewith about said central axis thereof concentric with said central axis of said boring head means, said drive means having an interior axial passageway formed along the length thereof, said boring drive assembly having tool adjustment means having a diameter less than the diameter of said passageway, said adjustment means being disposed in said passageway along the length thereof, a forward portion of said adjustment means operatively engaging said cam assembly means, said portion of said cam assembly means engaging said tool means, said cam assembly being movable along the central axis of said boring head means by movement of said adjustment means independently of said drive means to cause said tool means to be pivoted about said lateral axis to move said cutting portion of said tool means radially with respect to said central axis of said boring head means, to permit precise, selected positioning of said cutting portion of said tool means to allow, upon rotation of said boring drive means and said boring head means mounted thereon, and linear movement of said drive means and boring head means with respect to said turbine shaft, said boring assembly to cut an enlarged bore of selected diameter within the turbine shaft, said cutting tool means including at least two tool holding members, each of said tool holding members having said cutting portion disposed at a forward end of a lever arm portion, said cutting portion being formed by an outwardly extending cutting blade mounted on said end of said lever arm portion, and having a cam follower portion formed on the opposite end of said lever arm portion, said cam follower portion having a generally outwardly extending slot formed therein, each of said tool holding members being pivotally mounted in opposed, matable relationship on a pivot pin disposed transversely to said central axis of said boring head means along a diametrical axis of said boring head means for pivotal movement within said boring head means, said cam follower slot on each of said tool holding members engaging a portion of said axially adjustable cam assembly such that as said cam assembly is moved axially along the central axis of said boring head means, said portion of said cam follower assembly will be moved in said cam follower slot thereby causing each of said tool holding members to pivot in opposite directions about said pivot pin such that said cutting blades will be radially advanced outwardly or retracted inwardly.

5. The bottle boring assembly set forth in claim 4 including drive shaft drive motor means for rotating said boring drive means and boring head means mounted thereon about their concentric central axes at a sufficient speed to accomplish cutting of the interior surface of the bore of said turbine shaft when said cutting blades of said boring head means are brought into contact therewith, said drive motor means operatively engaging the drive means at a point therealong to effect rotation thereof upon actuation of said motor means, and linear drive motor means disposed in operative engagement with said boring drive means to move said drive means and said boring head means into the existing bore in the turbine shaft at a constant speed such that said boring head means will make a continuous cut within said turbine shaft as the boring drive means is rotated by said drive shaft drive motor means.

6. The boring assembly of claim 4 wherein said boring head means is a generally cylindrical hollow sleeve which may be mounted on said rotatable boring drive means for rotation threwith inside the existing bore of the turbine shaft to be bored.

7. The boring assembly set forth in claim 4 wherein said cam assembly means include a cam means disposed transversely to the central axis of said boring head means and along a diametrical axis thereof, said cam means being mounted between opposite and axially extending slots formed in said boring head means for travel therealong, said cam means engaging said cam follower portion of said tool means to move said tool means in response to the linear movement of said cam means along said central axis of said boring head means, said cam assembly means also including a yoke member mounted on said cam means to transmit linear movement to said cam means, said yoke member having a forked portion mounted on said cam means and a body portion integrally formed with said forked portion and disposed at an end of said yoke means opposite said cam means, said body portion adapted to threadedly engage transmission means mounted in a stationary axial position with respect to said boring head means, said transmission means being rotatable about a central axis thereof to move said yoke means and said cam means relative thereto and linearly with respect to said boring head means.

8. A portable bottle boring apparatus to selectively enlarge an intermediate portion of an axial bore in a stationary object while maintaining end portions of the bore at the original size comprising: a cutting tool to be inserted into the intermediate portion of the bore through one of the end portions of the bore and adapted to selectively enlarge the intermediate portion of the bore up to more than twice the original size of the bore; a boring head upon which said cutting tool is movably mounted for movement along the radial direction of the bore; selecting means external of the bore to determine desired radial positions of said cutting tool; control means responsive to said selecting means to transform a selection of a desired radial position of said cutting tool made externally of the bore into an activation of said cutting tool to accurately and precisely set said cutting tool at the desired position; first drive means to adjustably locate said boring head along the axis of the bore; second drive means to rotate said boring head, and hence said cutting tool, in the bore; bearing means to accurately position said boring head with respect to the axis of the bore, regardless of the length of the intermediate portion of the bore, while permitting rotation of said boring head; and mounting means to accurately position the bottle boring apparatus with respect to the axis of the bore, regardless of where the stationary object is located.

9. A portable bottle boring apparatus as claimed in claim 8 and further comprising a second cutting tool, said cutting tools being pivotably mounted at a common pivot point on the axis of the bore and being simultaneously movable in opposite radial directions upon activation by said control means.

10. A portable bottle boring apparatus as claimed in claim 8 wherein said cutting tool comprises: a pivotably mounted tool arm; a cam follower portion at one end of said tool arm having a cam follower slot formed therein; and a cutting blade portion at the other end of said tool arm.

11. A portable bottle boring apparatus as claimed in claim 10 wherein said cutting blade portion comprises a standard tool bit which may be easily removed and replaced.

12. A portable bottle boring apparatus as claimed in claim 10 wherein said boring head comprises a generally cylindrical shell concentric with the bore and having a pivot pin diametrically located therein to mount said tool arm.

13. A portable bottle boring apparatus as claimed in claim 10 wherein said control means comprises: a cam assembly mounted for axial movement to engage said cam follower portion of said cutting tool and set said cutting tool at the desired position along the radius of the bore; and adjustment means actuated by said selecting means to drive said cam assembly in the axial direction.

14. A portable bottle boring apparatus as claimed in claim 13 wherein said cam assembly comprises: a yoke having a threaded portion formed at the base end thereof and mounted for axial movement along the bore; and a cam pin mounted between the axis of said yoke and adapted to engage said cam follower slot to set the radial position of said cutting tool upon axial movement of said yoke.

15. A portable bottle boring apparatus as claimed in claim 14 wherein said adjustment means comprises: a threaded bar mounted for free rotation and adapted to engage said threaded portion of said yoke; and a torque tube to drive said threaded bar to actuate said yoke.

16. A portable bottle boring apparatus as claimed in claim 15 wherein said torque tube is hollow to permit a fluid to be introduced to the vicinity of said cutting tool for cooling and cleaning.

17. A portable bottle boring apparatus as claimed in claim 15 wherein said selecting means comprises a calibration disk attached to said torque tube.

18. A portable bottle boring apparatus as claimed in claim 8 wherein said mounting means comprises a feed table.

19. A portable bottle boring apparatus as claimed in claim 8 wherein said bearing means comprises at least one friction reducing bearing member located adjacent said boring head and adapted to engage the bore at its original size.

20. A portable bottle boring apparatus to selectively enlarge an intermediate portion of an axial bore in a stationary turbine shaft while maintaining end portions of the bore at the original size comprising: a generally cylindrical shell concentric with the bore; a pivot pin diametrically located in said shell; a pair of cutting tools pivotably mounted on said pivot pin, each of said cutting tools having a cutting blade portion at one end of a tool arm and a cam follower portion with a curvilinear cam follower slot at the other end thereof; a yoke having a base portion and a pair of extending arms mounted for axial movement in said shell; a cam pin mounted between said arms of said yoke and adapted to engage said cam follower slots to simultaneously set said cutting tools in opposing radial directions upon axial movement of said yoke; threads formed on said base portion of said yoke; a threaded transmission bar axially mounted in said shell for free rotation with respect thereto and adapted to engage said threads on said yoke; a torque tube to drive said transmission bar to actuate said yoke for axial movement to produce radial movement for said cutting tools; a boring drive shaft threadedly connected to said shell; bearing means to accurately position said drive shaft and said shell with respect to the axis of the bore, regardless of the length of the intermediate portion of the bore, while reducing rotational friction; a calibration disk affixed to said torque tube and releasably affixed to said boring drive shaft, positioning of said calibration disk accurately determining the radial setting of said cutting tools by activation of said torque tube, said transmission bar and said yoke with respect to said boring drive shaft and said shell; first drive means to adjustably locate said boring drive shaft and said shell along the axis of the bore; second drive means to rotate said boring drive shaft, said shell and said cutting tools; and mounting means to accurately position the bottle boring apparatus with respect to the axis of the bore, regardless of where the turbine shaft is located.

* * * * *